May 2, 1961 D. F. McGILL 2,982,156
POWER TRANSMISSION MECHANISM
Filed Oct. 28, 1958 2 Sheets-Sheet 2

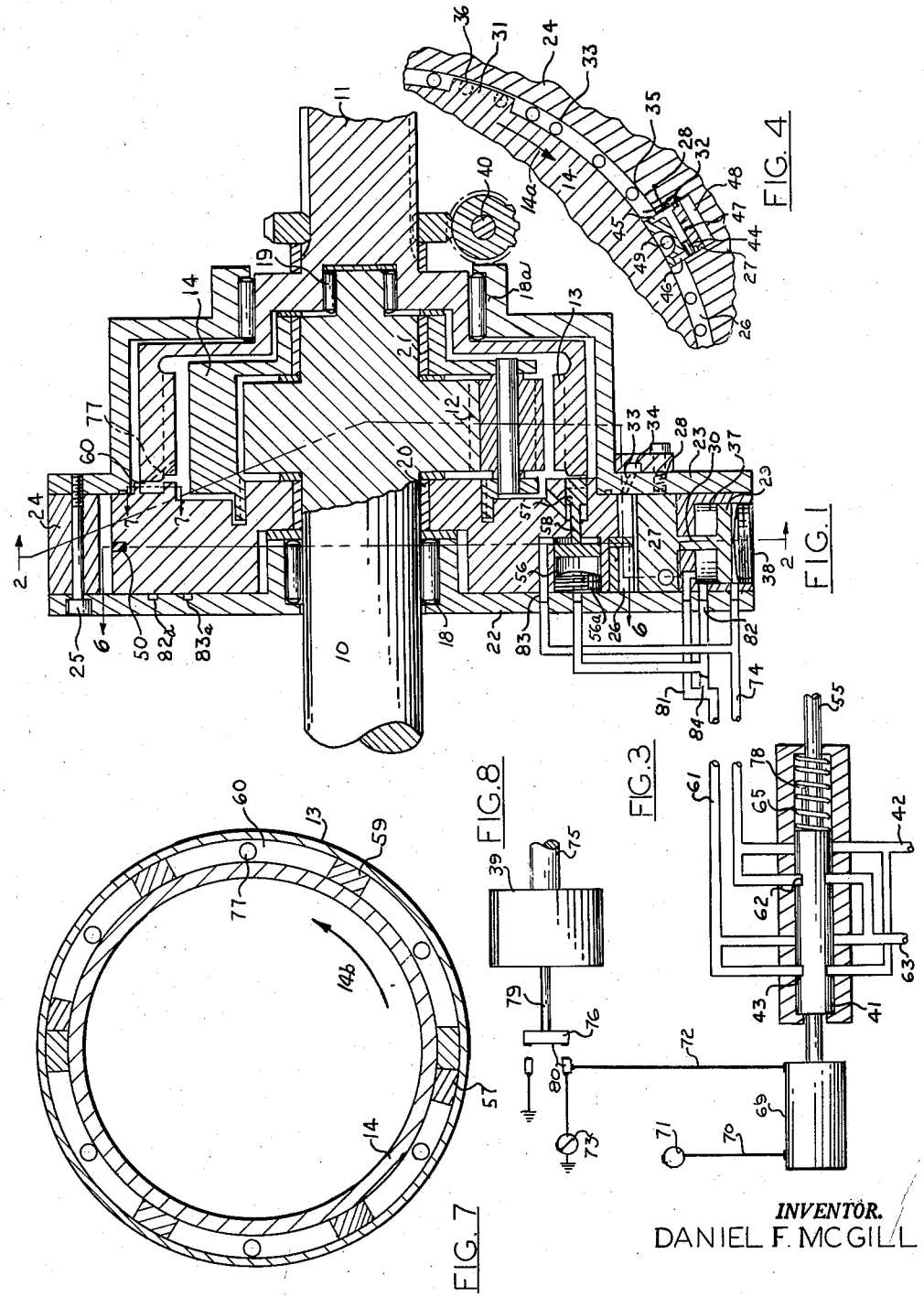

*INVENTOR.*
DANIEL F. MCGILL

United States Patent Office 2,982,156
Patented May 2, 1961

2,982,156
POWER TRANSMISSION MECHANISM
Daniel F. McGill, 2344 NE. 52nd Ave., Portland 13, Oreg.
Filed Oct. 28, 1958, Ser. No. 771,702
19 Claims. (Cl. 74—764)

This invention relates to planetary gear trains for power transmission from a driving shaft to a driven shaft, having different speed and torque ratios.

The general object of the invention is to provide a compact and effective transmission of power in certain definite ratios and compound ratios when driven through one or more gear trains with a minimum of weight and space required.

An important object is to provide a planetary gear transmission that is capable of changing the driving ratio without shock when operating under very heavy loads through compound ratios as well as other ratios.

A further object is to provide a planetary gear transmission that is capable of changing the driving ratio automatically, manually or electrically with the shock of the change hydraulically balanced out.

A further object is to provide a planetary gear transmission having a large part of the reacting forces mechanically balanced out with the forces acting on one gear balanced against the forces acting on another gear.

A further object is to provide a planetary gear transmission in which a fluid cushion is formed between the members as they are being locked together during the ratio change.

A further object is to provide a control ring to permit or prevent the engagement of the lockup members under certain conditions.

Another object is to provide a double check valve in a stop member to prevent the fluid pressure from lifting the stop off its seat when making the lockup for the ratio drive.

Another object is to provide means to progressively close the fluid discharge ports in the stationary member to form a fluid cushion to absorb the reaction shock that may otherwise occur between the members, as the gear carrier member approaches a complete lockup.

Another object is to provide a planetary gear transmission that when making a ratio change the release of the engaged ratio has a lead over the engagement of another ratio.

Further objects and features of my invention will be more clearly understood by reference to the following detailed description of the accompanying drawings, in which Figure 1 is a longitudinal sectional view of the invention;

Figure 3 is a plan view of the piping, solenoid and a cross section of the control valve;

Figure 4 is a fragmentary sectional view of the gear carrier member taken through the gear carrier projection and the stationary member showing the stop mounted therein;

Figure 7 is a cross section of the ring gear projection taken on line 7—7 in Figure 1; and Figure 8 is a diagram of the governor.

Figures 2, 5, 6:
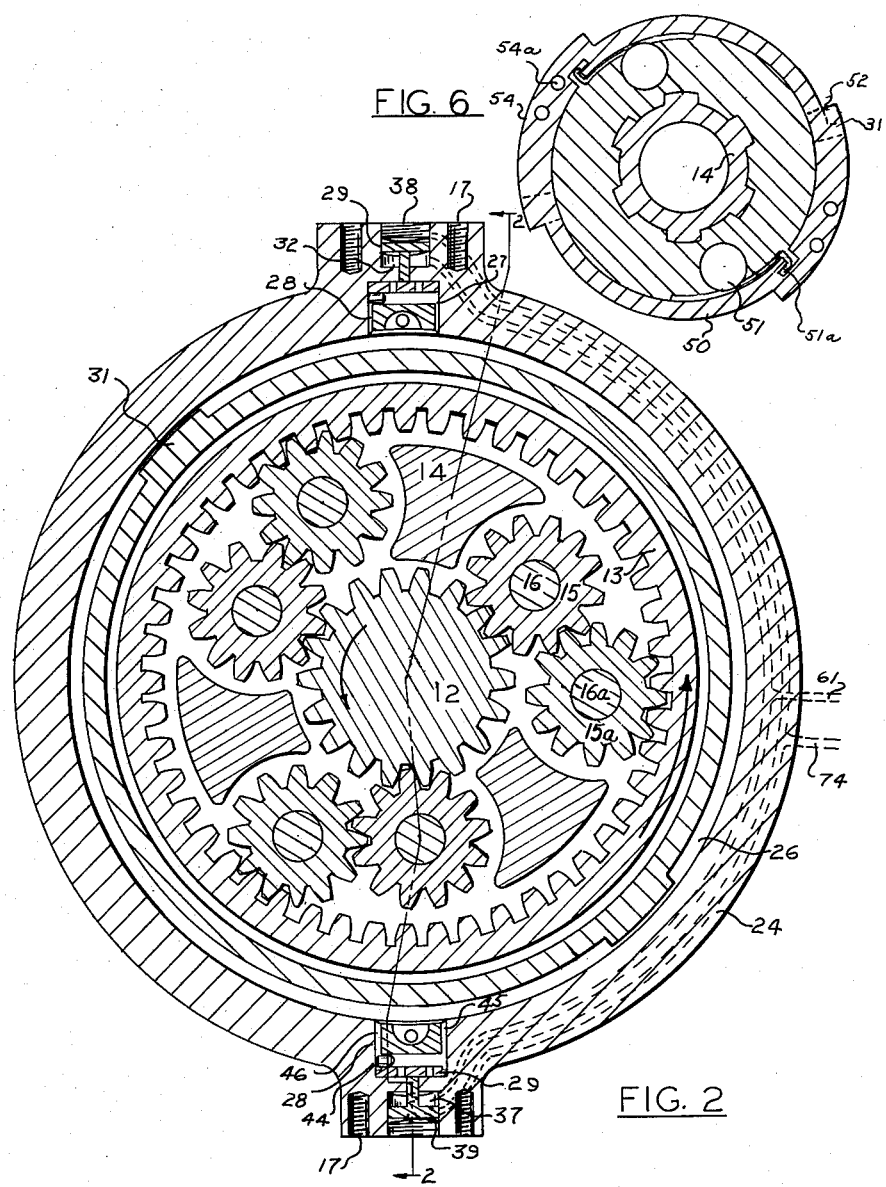
Figure 2 is a cross section taken on line 2—2 in Figure 1.
Figure 5 is a fragmentary cross sectional view of the shock control ring mounted in the gear carrier projection.
Figure 6 is a cross section of the shock control ring taken on line 6—6 in Figure 1.

In the transmission disclosed there is a driving member, a driven member, a gear carrier member and a stationary member. The first three members are rotatably mounted to lock and operate as a unit when in a one to one drive and the gear carrier member is mounted to lock up with the stationary member when in a ratio drive. There is no reverse drive shown.

In the gear carrier member there is mounted a first and second gear with the reaction of the first gear in a clockwise direction and the reaction of the second gear in a counterclockwise direction. The difference of these reacting forces is the holding force required when locking the gear carrier member for the one to one drive, or when locking the gear carrier member for the ratio drive.

In Figure 1, numeral 10 designates the input shaft of the planetary gear transmission with 11 representing the output shaft. Numeral 12 represents the input gear and 13 the internal ring gear and 14 the gear carrier member. Carrier gear 15 mounted on shaft 16 is meshed with input gear 12 and carrier gear 15a mounted on shaft 16a is also meshed with internal ring gear 13.

The transmission is mounted on stationary housing 24 and bolted to the vehicle frame at bolt mounting 17 in Figure 2, with the input and output shafts carried on bearings 18 and 18a. Bearing 19 is for shaft alignment between the input and output shafts, with sleeve bearings 20 and 21 supporting gear carrier member 14. End plates 22 and 23 are mounted on stationary member 24 by bolts 25 forming fluid channel 26.

Stops 27 are mounted in stationary member 24 between end plates 22 and 23 in stop slots 28 in Figures 2 and 4. Stops 27 are raised and lowered into channel 26 by fluid pressure operated pistons 29 with stops 27 attached thereto by shoulders 30. Gear carrier member 14 having projections 31 extending into fluid channel 26 forming fluid pressure chamber 32 when stops 27 are lowered into channel 26 to lock the transmission into a ratio drive and with projections 31 in the position shown, in Figure 4, the load reaction on carrier 14 is in a counterclockwise direction as indicated by arrow 14a, with projections 31 moving toward stop 27. Fluid pressure formed in chamber 26 between projection 31 and stop 27 tends to retard the counterclockwise rotation on carrier 14 and, as projection 31 moves toward stop 27, it forces the fluid through ports 33 and 35 in end plate 23 into by-pass channel 34 past stop 27 and through the ports on the opposite side of stop 27 back into channel 26. Ports 36 having been closed, thereby reducing the fluid discharge area, as projection 31 moves toward stop 27. As projection 31 approaches stop 27 with only port 35 open to permit the escape of the fluid, carrier 14 will have come to a near stop as it contacts stop 27, thereby having absorbed all of the sudden load reaction shock on carrier 14 which is then held stationary for the ratio drive.

In the transmission lockup for the one to one drive, piston 56 is mounted in cylinder 56a in carrier 14 with stops 57 attached thereto by shoulder 58. When fluid pressure is applied to the outer end of piston 56 it moves inwardly and moves stop 57 into recess channel 60, formed by gear carrier member 14 and ring gear 13 and, as power is applied to input gear 12, stop 57 bears against projection 59, on ring 13, taken through line 7—7 in Fig. 1 and shown in Fig. 7 and, locks the transmission in a one to one drive with input shaft 10, carrier member 14 and output shaft 11 rotating as a unit in a clockwise direction, as indicated by arrow 14b.

Channel 60 is kept filled with oil through ports 77 by the ring gear as it rotates and the oil acts as a fluid cushion as the lockup is being made.

A diagram of the controls is shown in Figure 3, showing a cross section of control valve 41 and the piping to the transmission control pistons in which valve 41 is provided with ports 43 and 62. The transmission is shown in a one to one drive with spring 65 holding valve 41 in a position to cause port 43 to register pressure pipe 42 with pipe 61. Pipe 61 leads to the outer end of piston 56 to hold stop 57 in engagement with ring gear projection 59 and through pipe 81 to the inner end of piston 29 holding stop 27 out of channel 26. Valve ports 62 are in a position to cause release pipe 63 to register with pipe 74 and leads to cylinder 56a to the inner end of piston 56 and to cylinder 37, formed by plug 38 to the outer end of piston 29 to release fluid pressure therefrom.

The oil pressure to operate the pistons for the change of ratio may be from the engine lubricating system or any other suitable source.

The controls may be operated by applying fluid pressure to the pistons in advance of the time for the actual change of ratio when on an up-grade and, when the time has come for the change of ratio, the operator then can release the accelerator momentarily to release the load on the gears and stops, which will then allow the pistons to operate the ratio change.

Check valve 84 in pipe 82 directs the fluid pressure through pipe 81 to cylinder 37 at the inner end of piston 29 and pipe 82 is taken off the side of cylinder 37 and leads to the outer end of piston 56 in cylinder 56a. Pipe 82 is taken off the side of cylinder 37 up a distance from the inner end so that when piston 29 is down it acts as a valve to close pipe 82 off from fluid pressure until piston 29 has raised enough to open the port to pipe 82, this gives a lead in the release of the ratio lockup over the engagement of the one to one lockup. While not shown in the drawings, pipe 74 leading to the inner end of cylinder 56a may also be arranged to give piston 56 a lead over piston 29 when making a change from the one to one to the ratio drive.

To operate the controls from the one to one drive to the ratio drive, stem 55 on valve 41 may be manually operated to compress spring 65 and move valve 41 against shoulder 78 on the valve stem and cause ports 43 to register pipe 61 with release pipe 63, and ports 62 to register pipe 74 with pressure pipe 42. This puts the controls in a position that will cause piston 56 to raise stop 57 from the one to one lockup and piston 29 to move stop 27 into channel 26 to lock gear carrier member 14 stationary for the ratio drive lockup.

Ports 82a in cover plate 22 are to register pipe 82 with the outer end of piston 56 and port 83a to register pipe 74 with the inner end of piston 56 as carrier 14 rotates.

While check valve 84 gives piston 29 a lead over piston 56, pipe 74 may be so arranged that piston 56 will have the same type of lead over piston 29.

To operate the change of ratio by push button control, solenoid 69 is connected by wire 70 to live wire contact 71 with wire 72 leading to push button ground switch 73. This energizes solenoid 69 and moves valve 41 to compress spring 65 to make the ratio change.

In Figure 8, governor 39 is mounted on shaft 75 and when connected to speedometer shaft 40 will, at a predetermined speed of the vehicle, move shaft 79 to cause contact 76 to ground solenoid 69 through wire 72 at 80.

These various arrangements will permit the change of ratio electrically, automatically or manually as desired for a particular installation.

To make a change of ratio, it is necessary to release the load on the gears and stops, which may be accomplished by releasing the accelerator, or other suitable means.

When operating in a one to one drive, input gear 12, gear carrier member 14 and internal ring gear 13 are operating as a unit in a clockwise rotation and when the change is made to the ratio drive, the carrier's clockwise rotation must be stopped. When the change is made, stop 57 has to be raised from channel 60 and stop 27 lowered into channel 26, but, with carrier 31 rotating in the clockwise direction, it compresses the fluid in channel 26 against stop 27 and retards the carrier member 14. Then, as the load is applied between input gear 12, the gears on carrier 14 and ring gear 13, the reaction on carrier member 14 is reversed to a counterclockwise rotation with projection 31 in channel 26 turning counterclockwise toward the opposite side of stop 27 to have the reaction shock hydraulically absorbed as it becomes stationary against stop 27 for the ratio drive.

When input gear 12 is rotated in a clockwise direction to turn gear 15, it tends to rotate carrier 14 in a clockwise direction, however, when gear 15 tends to turn gear 15a in a counterclockwise direction to drive internal ring gear 13 in a clockwise direction, in the ratio drive, the differential reaction on gear carrier member 14 is in a counterclockwise direction. The differential in the direction of these forces on carrier 14 is in the counterclockwise direction and is the holding force required against stop 27. By balancing these reaction forces out one against the other it is possible to obtain low compound gear ratios by operating with more than one gear train without producing undue reaction strain on the carrier member holding parts.

Stop 27 mounted on stationary member 24 has a double check valve 44 mounted in cylinder 44a with ports 45 and 46 leading from chamber 26, on either side of stop 27, to valve cylinder 44a and with ports 47 leading from cylinder 44a to chamber 48 at the top of stop 27. As fluid pressure is applied to either end of cylinder 44a, valve 44 is moved to close the port leading from the low pressure side of stop 27, this permits fluid pressure to the outer end of stop 27 in chamber 48 to prevent a sudden rise in the fluid pressure on either side of stop 27 from lifting the stop off its seat in channel 26. Port 49 at inner end of stop 27, in end plate 23, empties into by-pass channel 34 to release the fluid under the stop.

In Figures 1, 5 and 6, shock control ring 50 is shown mounted in gear carrier member 14, taken on line 6—6 in Figure 1, with raised portion 54 held in the forward position relative to projection 31, in Figure 5, and in dotted lines, in Figure 6, by springs 51 hooked to ring 50 at 50a and held against stop 52 on projection 31. As projection 31 rotates in a counterclockwise direction, during the ratio change, toward stop 27, control ring 50 moves back against stop 52 in recess 50b by force of the fluid on the end of the raised portion 54, or by mechanical force as raised portion 54 moves toward and contacts stop 27. Holes 54a will permit oil to pass crosswise through raised portion 54 of control ring 50 as projection 31 moves toward stop 27.

If an attempt is made to move stop 27 into channel 26 and it should enter on raised portion 54, control ring 50 will slide under inner end of stop 27 to the opposite side of projection 31 and then enter channel 26 to come to a cushioned stop as it approaches the next stop 27.

Having now described my invention and in what manner it may be used, what I claim as new and desire protection by Letters Patent is:

1. In a planetary gear transmission comprising a driving gear member, a driven internal gear member having a projection mounted thereon, a rotatable gear carrier member having a first gear meshed with said driving gear and a second gear meshed with said driven gear and said first gear, a stationary member having a stop mounted thereon, said rotatable gear carrier member having a projection and a stop mounted thereon, means to lock said driving member to said gear carrier member and said driven member to rotate as a unit, means to release said locking means, means to lock said gear carrier member with said stationary member for a ratio drive, means to release said stationary locking means, means to release one of said lock-up means in advance of the engagement with other said lock-up means.

2. In a planetary gear transmission comprising a driving gear member, a driven member internal gear having a projection mounted thereon, a rotatable gear carrier member having a projection and a stop mounted thereon, a first gear mounted on said gear carrier member meshed with said driving gear and a second gear driven by said first gear and meshed with said driven gear, hydraulic stop means on said gear carrier member to lock said gear carrier member to said driven member, a stationary member having a stop mounted thereon, hydraulic stop means on said stationary member to lock said gear carrier member stationary, hydraulic means to release said gear carrier member from one of said stop means in advance of the locking of other said stop means, means to cushion shock between said members when making a lock-up.

3. A planetary gear transmission comprising a driving member, a driven member having a projection mounted thereon, a rotatable gear carrier member having a projection and a stop mounted thereon, and a channel for said driven member projection to rotate therein, a stationary member having a stop mounted thereon and a channel for said gear carrier projection to rotate therein, means to engage or release said stops to lock said transmission in a selected ratio drive, fluid in said channels forming a cushion to absorb shock as said stops are engaged for a selected ratio drive, and means providing for the release of one ratio drive in advance of another ratio lock-up.

4. A planetary gear transmission comprising a driving gear member, a driven internal gear member having a projection mounted thereon, a rotatable gear carrier member having a projection, a piston and a stop mounted thereon and a recess therein, said driven member with said carrier member forming a fluid chamber, said driven member projection mounted to rotate in said fluid chamber, a stationary member having a piston and a stop mounted thereon between end plates, said carrier and said stationary member forming a fluid chamber, said carrier projection mounted to rotate in said fluid chamber, hydraulic means to operate said pistons to release or engage said stops when making a selected ratio change, fluid in one of said chambers forming a cushion between one of said stops and one of said projections when a selected ratio change is being made, and means providing the release of one ratio lockup in advance of the engagement of another ratio lock-up.

5. A planetary gear transmission comprising a driving gear member, a driven gear member having a projection mounted thereon, a rotatable gear carrier member having a projection, a piston and a stop mounted thereon and a recess formed therein, said recess and said driven member forming a fluid chamber, hydraulic means to operate said piston and said stop to lock said transmission in a one to one drive, fluid in said chambers forming a shock absorber between said projection and said stop when a lock-up is being made for the one to one drive.

6. A planetary gear transmission comprising a driving member, a driven member, a rotatable gear carrier member having a projection mounted thereon, a stationary member having a piston and a stop mounted thereon, said stationary member and said gear carrier member forming a fluid chamber, said carrier projection mounted to rotate in said chamber, hydraulic means to operate said piston to engage said stop with said projection and lock said transmission in a ratio drive, fluid in said chamber forming a cushion between said projection and said stop as said ratio change is being made.

7. A planetary gear transmission comprising a driving member, a driven member having a projection mounted thereon, a rotatable gear carrier member having a projection, a piston and a stop mounted thereon and a recess formed therein, said driven member and said recess forming a fluid chamber, hydraulic means to operate said piston and stop to engage said driven member projection and lock said transmission in a one to one drive, a stationary member having a piston and a stop mounted thereon, said stationary member and said gear carrier member forming a fluid chamber, hydraulic means to operate said piston and said stop to engage said carrier member projection to lock said transmission in a ratio drive, said fluid forming a cushion between said stop and said projections as they engage.

8. A planetary gear transmission comprising a driving member, a driven member having a projection mounted thereon, a rotatable gear carrier member having a projection, a piston and a stop mounted thereon and a recess formed therein, hydraulic means to operate said stop to lock said driven member and said gear carrier member for a one to one drive, said gear carrier member with said driven member forming a fluid chamber to cushion the shock between said members as said lock-up is being made, a stationary member having a stop mounted thereon, hydraulic means to operate said stop to engage said carrier member projection to hold said carrier stationary for a ratio drive, said carrier member with said stationary member forming a fluid chamber to cushion the shock between said stop and said projection, and means providing the release of one ratio lock-up over the engagement of another ratio lock-up.

9. A planetary gear transmission comprising a driving member, a driven member having a projection mounted thereon, a rotatable gear carrier member having a projection and a stop mounted thereon, means to engage said stop with said driven member projection to cause said member to rotate as a unit in a positive one to one drive, a stationary member having a stop mounted thereon, means to engage said stationary stop with said carrier projection for a ratio drive, said driving member driving through said gear carrier member to drive said driven member, means to release one of said stops and engage other said stop to lock said transmission in a selected ratio drive, means providing a lead for the release of one ratio drive in advance of the engagement of another ratio drive.

10. In a planetary gear transmission comprising a driving gear member, a driven internal gear member, a rotatable gear carrier member with projections mounted thereon, said gear carrier member having a first and second gear mounted thereon, said first gear meshed with said driving gear and said second gear, said second gear meshed with said internal gear, a stationary member with a stop mounted thereon between end plates, said stationary member and said gear carrier member forming a fluid chamber, means to lock said driving said carrier and said driven members to rotate as a unit in a one to one drive, means to lock said gear carrier member stationary for a ratio drive, means to release one of said drives in advance of the engagement of other said drive, a series of fluid discharge ports in said fluid chamber arranged to be closed progressively by said rotating gear carrier projections when making a ratio lock-up reducing said discharge port causing said gear carrier to come to a smooth stop.

11. In a planetary gear transmission comprising a driving gear member, a driven gear member having a projection mounted thereon, a rotatable gear carrier member having a first gear meshed with a second gear, said gear carrier member having a projection and a stop mounted thereon, said first gear meshed with said driving gear and said second gear meshed to said driven gear, means to lock said driven gear member projection to said rotatable gear carrier member stop for a one to one drive, a stationary member, means to lock said gear carrier member with a stop mounted thereon, to said stationary member stop for a ratio drive, means to release the engagement of one drive in advance of the engagement of another drive.

12. In a planetary gear transmission comprising a driving gear, a driven gear member having a projection mounted thereon, a rotatable gear carrier member having a first gear meshed with a second gear and said driving gear, said second gear meshed with said driven gear, said carrier member having a projection and a stop mounted thereon, hydraulic means to lock said gear carrier member stop with said driven gear member projection for a one to one drive, a stationary member with a stop mounted thereon, hydraulic means to lock said gear carrier member to said stationary member stop for a ratio drive, hydraulic means to prevent the engagement of one of said lock-up means until after the release of the other said lock-up means, hydraulic means to operate said means.

13. In a planetary gear transmission comprising a driving gear member, a driven gear member, a rotatable gear carrier member, said gear carrier member having a meshed first and second gear mounted thereon with one of said gears meshed with said driving gear member and other said gear meshed with said driven gear member, means to lock said members to rotate as a unit for a positive one to one drive, means to lock said gear carrier stationary for a ratio drive, means to release one ratio drive in advance of the engagement of other ratio drive.

14. In a planetary gear transmission comprising a driving member, a driven gear member, a rotatable gear carrier member, said gear carrier member having a meshed first and second gear mounted thereon with one of said gears meshed with said driving gear member and other said gear meshed with said driven gear member, hydraulic means to lock said members to rotate as a unit for a positive one to one drive, hydraulic means to lock said gear carrier member stationary for a ratio drive, hydraulic means to release one drive in advance of the engagement of other drive, means to operate said hydraulic means.

15. In a planetary gear transmission comprising a driving member, a driven gear member having a projection mounted thereon, a rotatable gear carrier member having a first gear meshed with a second gear thereon, one of said gears meshed with said driving gear and other said gear meshed with said driven gear, said driven gear member forming with said carrier member a fluid chamber, said driven member projection mounted to extend into said fluid chamber, said gear carrier member having a stop mounted thereon, means to move said stop into said fluid chamber forming a cushion between said stop and said driven gear member projection when making a one to one ratio lock-up, a stationary member having a stop mounted thereon, said gear carrier having a projection mounted thereon, said stationary member and said carrier member forming a fluid chamber with discharge ports therein, means to move said stop into said fluid chamber forming a cushion as said rotating carrier projection closes said discharge ports before contacting said stationary stop during the change to a ratio drive, means providing for the release of one ratio in advance of the engagement of another ratio.

16. In a planetary gear transmission comprising a driving member, a driven member having a projection mounted thereon, a rotatable gear carrier member having a piston a stop and a projection mounted thereon, said gear carrier member having a first gear meshed with a second gear mounted thereon, said first gear meshed with said driving gear and said second gear meshed with said driven gear, said driven gear member forming with said gear carrier member a fluid chamber, said driven member projection mounted to rotate in said fluid chamber, piston means to move said stop into said fluid chamber to make the one to one ratio lock-up, fluid in said chamber forming a cushion between said stop and said driven member projection, a stationary member having a piston and a stop mounted thereon, said stationary member and said gear carrier member forming a fluid chamber having discharge ports, piston means to move said stop into said fluid chamber forming a cushion as said projection closes said discharge ports before contacting said stationary stop for the ratio drive, hydraulic means to operate said pistons, hydraulic means releasing one ratio drive in advance of the engagement of another ratio drive.

17. A planetary gear transmission comprising a driving gear member, a driven gear member, a rotatable gear carrier member, said gear carrier member having a meshed first and second gear mounted thereon with one of said gears meshed with said driving gear and other said gear meshed with said driven gear, hydraulic means to lock said members to rotate as a unit for a one to one drive, hydraulic means to lock said gear carrier member stationary for a ratio drive, hydraulic means to release one ratio drive in advance of the engagement of other ratio drive, valve means to control said hydraulic means, means to operate said valve means.

18. A planetary gear transmission comprising a driving member, a driven member, a rotatable gear carrier member, said carrier member having a meshed first and second gear mounted thereon with the first gear meshed with said driving gear and second gear meshed with said driven member, hydraulic means to lock said members to rotate as a unit for a one to one drive, a stationary member, hydraulic means to lock said gear carrier member stationary for a ratio drive, hydraulic means to release one of said drives in advance of the engagement of other said drive, valve means to control said hydraulic means, solenoid means to operate said valve means, means to operate said solenoid.

19. A planetary gear transmission comprising a driving member, a driven member having a projection mounted thereon, a rotatable gear carrier member having a stop and a projection mounted thereon, said gear carrier member having a first gear meshed with a second gear, said first gear meshed with said driving gear and said second gear meshed with said driven gear, said driven member forming with said carrier member a fluid chamber, piston means to move said stop into said fluid chamber forming a cushion as said stop contacts said driven member projection for a one to one drive, a stationary member having a piston and a stop mounted thereon, said stationary member and said gear carrier member forming a fluid chamber with discharge ports, piston means to move said stop into said fluid chamber forming a cushion as said rotating gear carrier projection closes said discharge ports before contacting said stationary stop for a ratio drive, means to prevent the moving of said stop into said fluid chamber when said carrier projection is in a position that would cause shock as said carrier projection contacts said stop, hydraulic means to release one ratio in advance of the engagement of other ratio drive, hydraulic means to operate said pistons.

References Cited in the file of this patent

UNITED STATES PATENTS

| | | |
|---|---|---|
| 2,552,000 | Dubois | May 8, 1951 |
| 2,737,061 | Kelley | Mar. 6, 1956 |
| 2,737,824 | Livermore | Mar. 13, 1956 |
| 2,762,237 | Kelbel | Sept. 11, 1956 |